(12) United States Patent
Onishi et al.

(10) Patent No.: US 7,161,745 B2
(45) Date of Patent: Jan. 9, 2007

(54) APERTURE STOP MECHANISM, ILLUMINATION OPTICAL SYSTEM, PROJECTION OPTICAL SYSTEM, AND PROJECTOR

(75) Inventors: Satoshi Onishi, Sakai (JP); Atsushi Matsuura, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 92 days.

(21) Appl. No.: 10/972,915

(22) Filed: Oct. 25, 2004

(65) Prior Publication Data

US 2005/0094291 A1    May 5, 2005

(30) Foreign Application Priority Data

Oct. 29, 2003    (JP)    ............... 2003-368711

(51) Int. Cl.
*G02B 9/00* (2006.01)
*G03B 9/10* (2006.01)
*G03B 9/40* (2006.01)

(52) U.S. Cl. .................. 359/738; 396/483; 396/484; 396/491; 396/493

(58) Field of Classification Search ............... 359/738, 359/739, 740; 396/483, 484, 486, 488, 489–491, 396/493
See application file for complete search history.

(56) References Cited

U.S. PATENT DOCUMENTS 5,028,946 A * 7/1991 Shinozaki et al. .......... 396/493

5,800,033 A    9/1998  Funanami et al.
6,648,476 B1   11/2003 Watanabe et al.

FOREIGN PATENT DOCUMENTS

| JP | 2001-174865 A | 6/1991 |
| JP | 3-114824 U | 11/1991 |
| JP | 4-20025 U | 2/1992 |
| JP | 2003-57715 | 2/2003 |

* cited by examiner

Primary Examiner—Scott J. Sugarman
(74) Attorney, Agent, or Firm—Brinks Hofer Gilson & Lione (57) ABSTRACT

An aperture stop mechanism is composed of a small number of components, and accurately controls the position of a member that defines the rim of an aperture. The aperture stop mechanism (2) includes an aperture base plate (21), two aperture blades (22, 23), and a motor(24). The aperture blades (22, 23) are individually pivotable about pins (21a, 21b) provided on the aperture base plate (21). One aperture blade (22) has two gears (22a, 22b) formed along arcs about the pin (21a) with different pitch circle radii. The other aperture blade (23) has a gear along an arc about the pin (21b). The gear (22b) meshes with a motor gear (25), and the gear (22a) meshes with the gear (23a).

21 Claims, 8 Drawing Sheets

APERTURE STOP MECHANISM, ILLUMINATION OPTICAL SYSTEM, PROJECTION OPTICAL SYSTEM, AND PROJECTOR

This application is based on Japanese Patent Application No. 2003-368711 filed on Oct. 29, 2003, the contents of which are hereby incorporated by reference.

BACKGROUND OF THE INVENTION

1. Field of the Invention

The present invention relates to an aperture stop mechanism for adjusting the size of an aperture through which light is passed. The present invention also relates to an illumination optical system, a projection optical system, and a projector provided with such an aperture stop mechanism.

2. Description of Related Art

In many optical apparatuses including cameras, it has conventionally been quite common to adjust the diameter of a light beam by intercepting the light traveling in a peripheral portion of the light beam by the use of an aperture stop mechanism having an aperture. For example, an aperture stop mechanism designed for use in a camera which permits the size of an aperture to be varied is disclosed in Japanese Patent Application Laid-Open No. 2003-57715.

Today, in projectors that display an image and then project the displayed image onto a screen, it is often permitted to switch between high-brightness settings, with which the image is presented with high brightness, and high-contrast settings, with which the image is presented with high contrast, according to the environment in which the projectors are used. For this purpose, an aperture stop mechanism that permits the size, shape, and position of an aperture to be varied is used.

A projector typically adopts, in the display section thereof for displaying an image, either a display device, such as a cathode-ray tube (CRT), that itself emits light that represents the image or a display device, such as a liquid crystal display (LCD) or digital micromirror device (DMD, a trademark of Texas Instruments Incorporated), that produces image light by modulating illumination light that is fed thereto. In a projector of the former type, an aperture stop mechanism is disposed in a projection optical system that projects the image light that emanates from the display section; in a projector of the latter type, an aperture stop mechanism is disposed in an illumination optical system that feeds illumination light to the display section, or in a projection optical system that projects the image light that emanates from the display section, or one in each of the illumination optical system and the projection optical system.

Figure 8A:
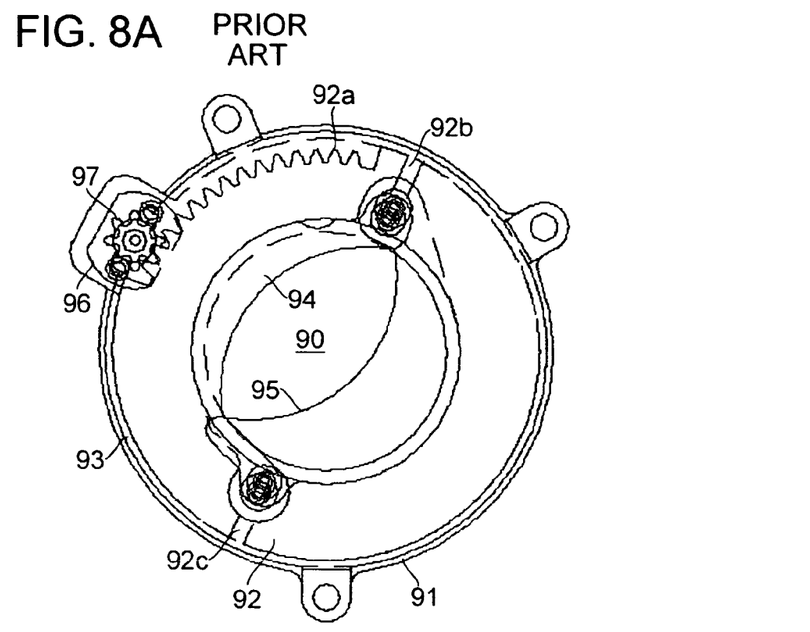
FIGS. 8A to 8C are diagrams schematically showing the construction of a conventional aperture stop mechanism.
Figure 8B:
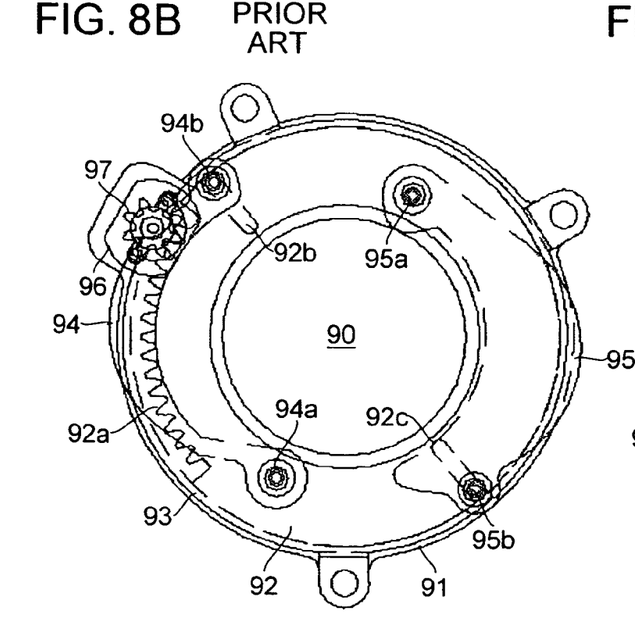
Figure 8C:
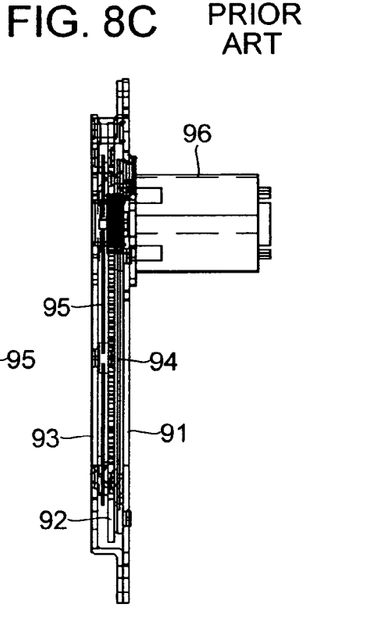

A conventional common aperture stop mechanism that permits the size and shape of an aperture to be varied is shown in FIGS. 8A to 8C. FIG. 8A is a front view with the aperture 90 fully stopped, and FIGS. 8B and 8C are a front view and a side view, respectively, with the aperture 90 fully open. This aperture stop mechanism includes an aperture base plate 91 and an aperture cover 93, with a blade chamber formed therebetween. In the blade chamber, a drive ring 92 is rotatably arranged. Between the aperture base plate 91 and the drive ring 92, an aperture blade 94 is arranged, and, between the aperture cover 93 and the drive ring 92, an aperture blade 95 is arranged.

The aperture base plate 91, aperture cover 93, and drive ring 92 each have a large circular opening at the center thereof. Along the rim of the opening of the aperture base plate 91, a wall that is elevated therefrom is formed for guiding the rotation of the drive ring 92. At the outer edge of the drive ring 92, a gear 92a is formed for receiving a driving force from a motor 96.

The aperture blade 94 has a pin 94a on the surface thereof facing the aperture base plate 91, and has a pin 94b on the surface thereof facing the drive ring 92. The pin 94a is inserted in a hole formed in the aperture base plate 91, and the pin 94b is inserted in a cam groove 92b formed in the drive ring 92. Thus, the aperture blade 94 can rotate about the pin 94a. The aperture blade 95 has a pin 95a on the surface thereof facing the aperture cover 93, and has a pin 95b on the surface thereof facing the drive ring 92. The pin 95a is inserted in a hole formed in the aperture cover 93, and the pin 95b is inserted in a cam groove 92c formed in the drive ring 92. Thus, the aperture blade 95 can rotate about the pin 95a.

When the motor 96 is driven, a motor gear 97 rotates, and, since this meshes with the gear 92a, the drive ring 92 rotates together. Thus, the pins 94b and 95b slide along the cam grooves 92b and 92c, causing the aperture blades 94 and 95 to rotate about the pins 94a and 95a. As a result, the size of the aperture, of which the rim is defined by the aperture blades 94 and 95, varies.

The aperture blades 94 and 95 can move completely out of the opening of the aperture base plate 91, and thus the rim of the fully open aperture is defined by the aperture base plate 91. Accordingly, the aperture blades 94 and 95 define the rim of the aperture except when it is fully open. The drive ring 92 only rotates, and remains in the same place all the time. Thus, the drive ring 92 takes no direct part in defining the rim of the aperture.

As described above, the conventional aperture stop mechanism includes an aperture base plate, an aperture cover, a drive ring, a plurality of aperture blades, a motor, and a motor gear; that is, it requires a large number of components and has a complicated construction. Fabricating these components and assembling them together requires much cost and time, and in addition the complicated construction is prone to failure. Moreover, since the aperture blades are moved by the action of the drive ring, if the cam grooves formed therein are shaped with low accuracy, the positions of the aperture blades do not exactly correspond to the amount of rotation of the motor. This makes it impossible to adjust the aperture to the desired size and shape.

SUMMARY OF THE INVENTION

In view of the conventionally experienced problems described above, it is an object of the present invention to provide an aperture stop mechanism that can be composed of a small number of components and that can accurately control the position of a member that defines the rim of an aperture. It is another object of the present invention to provide a projector that permits the brightness and contrast of the image it presents to be appropriately adjusted, and to provide an illumination optical system and a projection optical system for use in such a projector.

To achieve the above objects, in one aspect of the present invention, an aperture stop mechanism for forming an aperture through which to pass light is provided with: a movable member that defines the rim of the aperture, that changes the position thereof by moving in a direction along the aperture, and that permits at least one of the size, shape, and position of the aperture to vary. Here, the movable member has a gear, and moves as a result of the gear being driven.

In this aperture stop mechanism, the movable member that defines the rim of the aperture has a gear so as to receive a driving force through the gear. This eliminates the need to provide a member that serves solely to transmit the driving force, and thus helps reduce the number of components and thereby achieve a simple construction. Moreover, it is possible to directly control the position of the movable member, and thus it is possible to accurately adjust the size, shape, and the like of the aperture. The movable member may be made rotatable by giving the gear a finite pitch circle radius, or may be made translatable by giving the gear an infinite pitch circle radius.

In another aspect of the present invention, an illumination optical system for directing illumination light to an image display device that produces image light from the illumination light is, near the pupil thereof, provided with the aperture stop mechanism described above.

In still another aspect of the present invention, a projection optical system for projecting image light onto a screen is provided with the aperture stop mechanism described above.

In further aspect of the present invention, a projector is provided with: an image display device that produces image light by modulating illumination light; a light source that feeds the illumination light; an illumination optical system that directs the illumination light from the light source to the image display device; and a projection optical system that projects the image light from the image display device. The illumination optical system adopted here is the illumination optical system described above. The projection optical system adopted here may also be the projection optical system described above.

DETAILED DESCRIPTION OF PREFERRED EMBODIMENTS

Figure 1A:
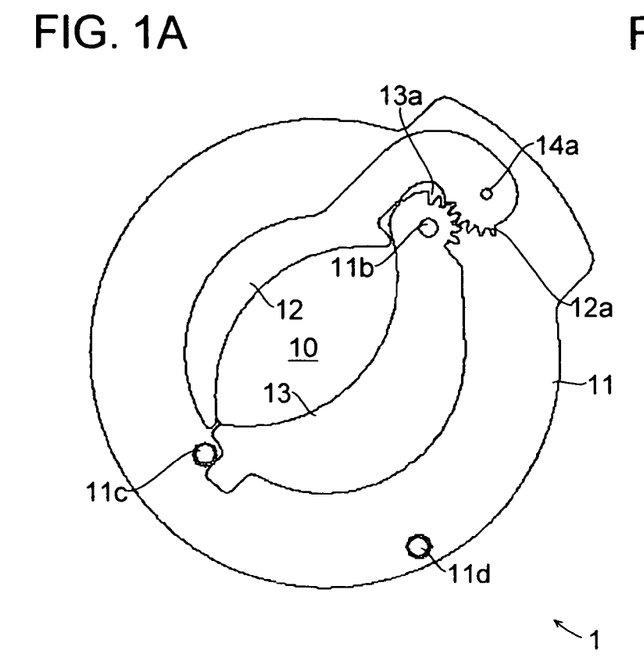
FIGS. 1A to 1C are diagrams schematically showing the construction of the aperture stop mechanism of a first embodiment of the invention.
Figure 1B:
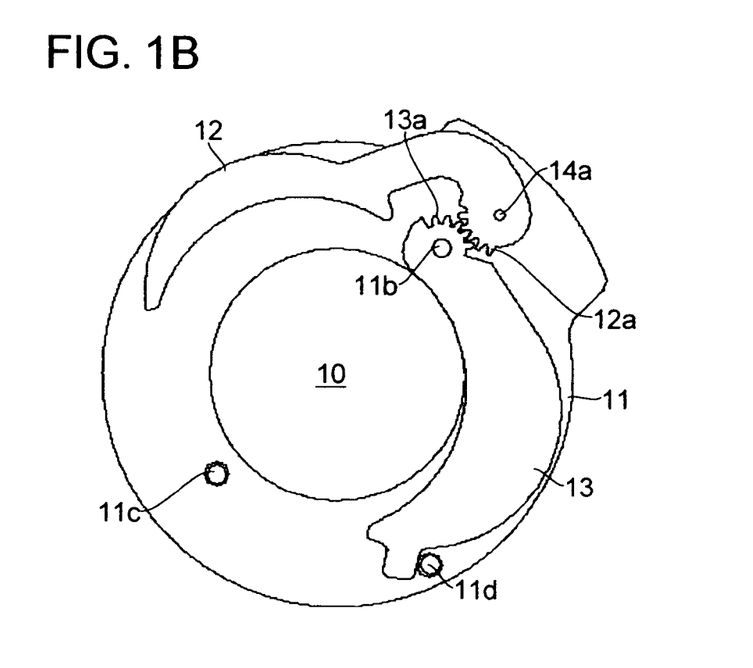
Figure 1C:
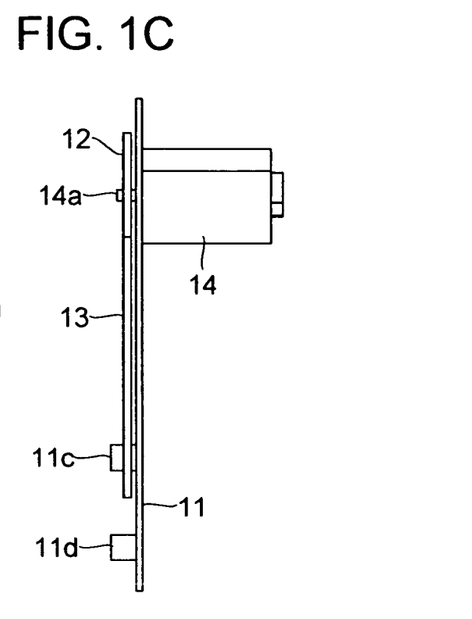

Hereinafter, embodiments of the present invention will be described with reference to the drawings. The aperture stop mechanism 1 of a first embodiment of the invention is shown in FIGS. 1A to 1C. FIGS. 1A and 1C are a front view and a side view, respectively, with an aperture 10 fully stopped, and FIG. 1B is a front view with the aperture 10 fully open.

The aperture stop mechanism 1 includes an aperture base plate 11, two aperture blades 12 and 13, and a motor 14.

The aperture base plate 11 has a large circular opening at the center thereof, and has, on the obverse-side surface thereof (i.e., the side facing the reader in FIG. 1A), three pins 11b, 11c, and 11d arranged perpendicularly to the opening. The motor 14 is fixed on the reverse-side surface of the aperture base plate 11 in such a way that the spindle 14a of the motor 14 reaches the obverse-side surface of the aperture base plate 11 through a small hole formed therein.

The aperture blades 12 and 13 are made of metal, are plate-shaped, and have edges that describe substantially circular arcs with which to define the rim of the aperture 10. The aperture blades 12 and 13 are both arranged on the obverse-side surface of the aperture base plate 11. The aperture blade 12 is, near an end portion thereof, fixed to the spindle 14a of the motor 14. Thus, the aperture blade 12 can rotate about the spindle 14a in a direction along the aperture 10. At the edge of the end portion of the aperture blade 12 close to the spindle 14a, a gear 12a is formed along a circular arc about the spindle 14a.

The aperture blade 13 has, near an end portion thereof, a hole formed therein. In this hole is inserted the pin 11b of the aperture base plate 11. The aperture blade 13 can rotate about this pin 11b in a direction along the aperture 10. At the edge of the end portion of the aperture blade 13 close to the pin 11b, a gear 13a is formed along a circular are about the pin 11b. The gear 12a of the aperture blade 12 and the gear 13a of the aperture blade 13 have the same tooth pitch.

The gears 12a and 13a mesh with each other, so that, as the motor 14 rotates, the aperture blade 12 rotates together, and thereby causes the aperture blade 13 also to rotate. The aperture blades 12 and 13 rotate in opposite directions, and thus, depending on the direction of rotation of the motor, the edges of the aperture blades 12 and 13 which define the rim of the aperture 10 move either closer to or away from each other. This permits the aperture 10 to vary the size and shape thereof.

An end portion of the aperture blade 13 far from the pin 11b, when it travels a predetermined distance toward the aperture blade 12, makes contact with the pin 11c of the aperture base plate 11; the same end potion of the aperture blade 13, when it travels a predetermined distance away from the aperture blade 12, makes contact with the pin 11d. Thus, the aperture blade 13, by making contact with the pins 11c and 11d, is prevented from moving farther. That is, the pins 11c and 11d define both ends of the range of movement of the aperture blade 13. Since the aperture blades 12 and 13 are coupled together by the gears 12a and 13a, the aperture blade 12, too, has both ends of the range of movement thereof defined by the pins 11c and 11d.

When the end portion of the aperture blade 13 is in contact with the pin 11d, no part of the aperture blade 13 lies in front of the opening of the aperture base plate 11, and likewise no part of the aperture blade 12 lies in front of the opening of the aperture base plate 11. That is, in the aperture stop mechanism I, when the aperture 10 is fully open, its rim is defined solely by the aperture base plate 11, and thus the aperture 10 then is circular.

Figure 2A:
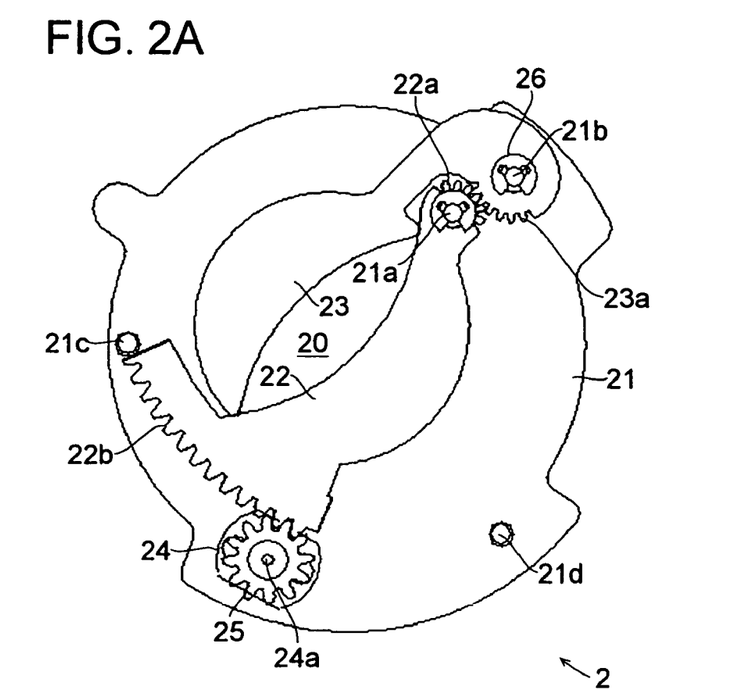
FIGS. 2A and 2B are diagrams schematically showing the construction of the aperture stop mechanism of a second embodiment of the invention.
Figure 2B:
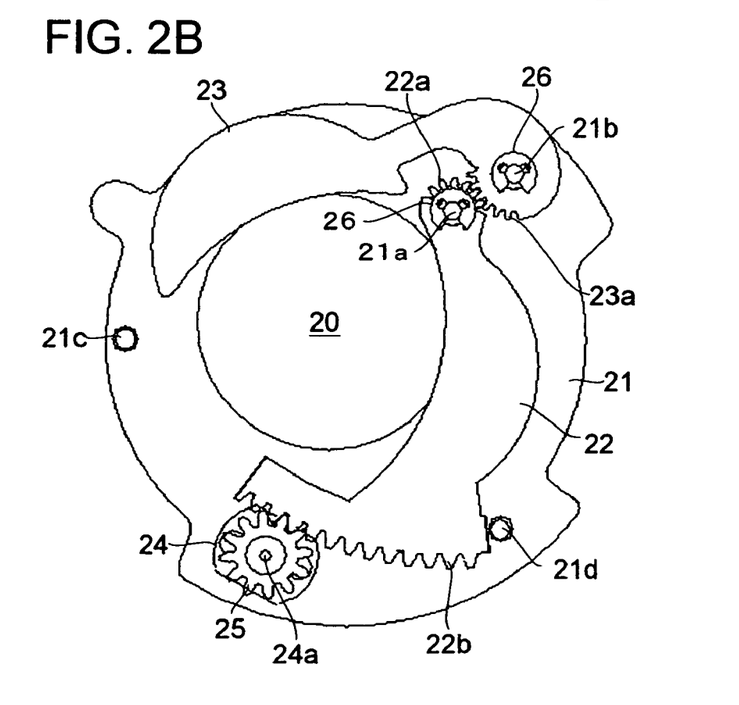

The aperture stop mechanism 2 of a second embodiment of the invention is shown in FIGS. 2A and 2B. FIG. 2A is a front view with an aperture 20 fully stopped, and FIG. 2B is a front view with the aperture 20 fully open. The aperture stop mechanism 2 includes an aperture base plate 21, two aperture blades 22 and 23, and a motor 24.

The aperture base plate 21 has a large circular opening at the center thereof, and has, on the obverse-side surface thereof (i.e., the side facing the reader in FIG. 2A), four pins 21a, 21b, 21c, and 21d arranged perpendicularly to the opening. The motor 24 is fixed on the reverse-side surface of the aperture base plate 21 in such a way that the spindle 24a of the motor 24 reaches the obverse-side surface of the aperture base plate 21 through a small hole formed therein. At the end of the spindle 24a of the motor 24 is fixed a circular motor gear 25.

The aperture blades 22 and 23 are made of metal, are plate-shaped, and have edges that describe substantially circular arcs with which to define the rim of the aperture 20. The aperture blades 22 and 23 are both arranged on the obverse-side surface of the aperture base plate 21. The aperture blade 22 has, near an end portion thereof, a hole formed therein. In this hole is inserted the pin 21a of the aperture base plate 21. The aperture blade 22 can rotate about this pin 21a in a direction along the aperture 20. At the edge of the end portion of the aperture blade 22 close to the pin 21a, a gear 22a is formed along a circular arc about the pin 21a.

Moreover, in an end portion of the aperture blade 22 far from the pin 21a, a gear 22b is formed along a circular arc. This gear 22b is formed about the pin 21a, and is thus concentric with the gear 22a, but has a different pitch circle radius therefrom. The gear 22b meshes with the motor gear 25.

The aperture blade 23 has, near an end portion thereof, a hole formed therein. In this hole is inserted the pin 21b of the aperture base plate 21. The aperture blade 23 can rotate about this pin 21b in a direction along the aperture 20. At the edge of the end portion of the aperture blade 23 close to the pin 21b, a gear 23a is formed along a circular arc about the pin 21b. The gear 22a of the aperture blade 22 and the gear 23a of the aperture blade 23 have the same tooth pitch.

The gears 22a and 23a mesh with each other, so that, as the motor 24 rotates and thus the motor gear 25 rotates, since the gear 22b meshes with the motor gear 25, the aperture blade 22 rotates together, and thereby causes the aperture blade 23 also to rotate. The aperture blades 22 and 23 rotate in opposite directions, and thus, depending on the direction of rotation of the motor, the edges of the aperture blades 22 and 23 which define the rim of the aperture 20 move either closer to or away from each other. This permits the aperture 20 to vary the size and shape thereof.

The end portion of the aperture blade 22 where the gear 22b is formed, when it travels a predetermined distance toward the aperture blade 23, makes contact with the pin 21c of the aperture base plate 21; the same end potion of the aperture blade 22, when it travels a predetermined distance away from the aperture blade 23, makes contact with the pin 21d. Thus, the aperture blade 22, by making contact with the pins 21c and 21d, is prevented from moving farther. That is, the pins 21c and 21d define both ends of the range of movement of the aperture blade 22. Since the aperture blades 22 and 23 are coupled together by the gears 22a and 23a, the aperture blade 23, too, has both ends of the range of movement thereof defined by the pins 21c and 21d.

When the end portion of the aperture blade 22 is in contact with the pin 21d, part of the edge of the aperture blade 22 lies in front of the opening of the aperture base plate 21, and likewise part of the edge of the aperture blade 23 lies in front of the opening of the aperture base plate 21. That is, in the aperture stop mechanism 2, when the aperture 20 is fully open, its rim is defined by the aperture base plate 21 and the two aperture blades 22 and 23.

In the aperture stop mechanism 2 of this embodiment, the spindle of the motor 24 is coupled to the aperture blade 22 via the motor gear 25 and the gear 22b. This makes it possible to use the rotation of the motor 24 after reducing it. Thus, there is no need to use as the motor 24 one with particularly high torque. Accordingly, it is possible to use various types of motor including a DC motor, AC motor, stepping motor, supersonic motor, and linear motor.

The pins 21a and 21b, which serve as the shafts about which the aperture blades 22 and 23 rotate, have a groove formed around them near the tip ends thereof. Around each of these grooves is fitted an E ring 26. This restricts the movement of the aperture blades 22 and 23 in the direction perpendicular to the aperture 20, preventing the aperture blades 22 and 23 from falling off the pins 21a and 21b and simultaneously keeping the gears 22a and 23a meshed with each other.

Although not illustrated in FIGS. 1A to 1C, also in the aperture stop mechanism 1 of the first embodiment, an E ring is fitted around the pin 11b near the tip end thereof to restrict the movement of the aperture blade 13, which is not fixed to the spindle 14a of the motor 14, in the direction perpendicular to the aperture 10.

Figure 3A:
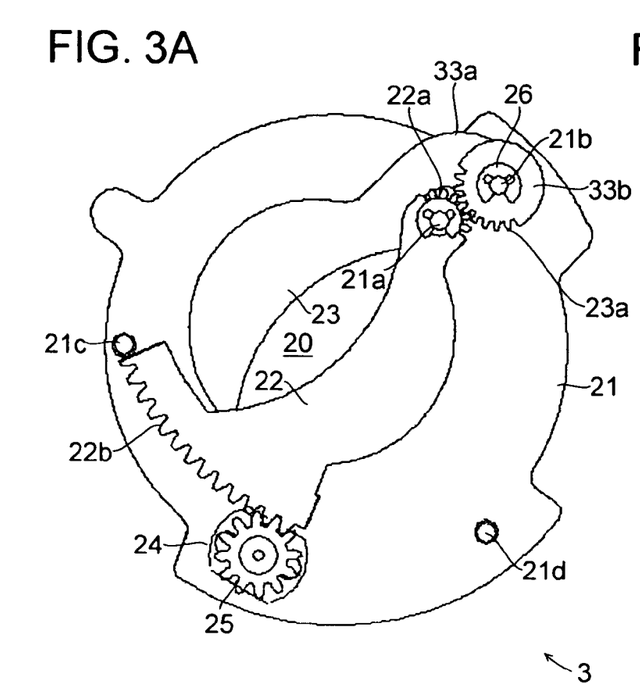
FIGS. 3A to 3C are diagrams schematically showing the construction of the aperture stop mechanism of a third embodiment of the invention.
Figure 3B:
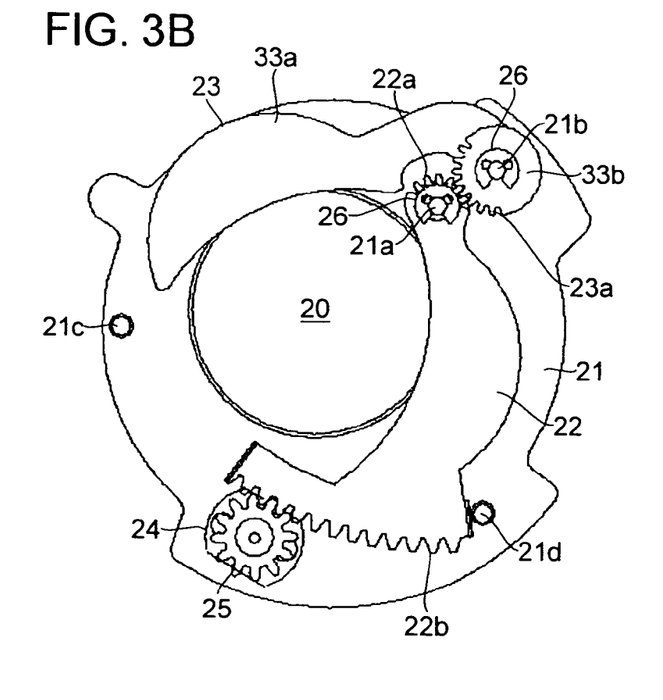
Figure 3C:
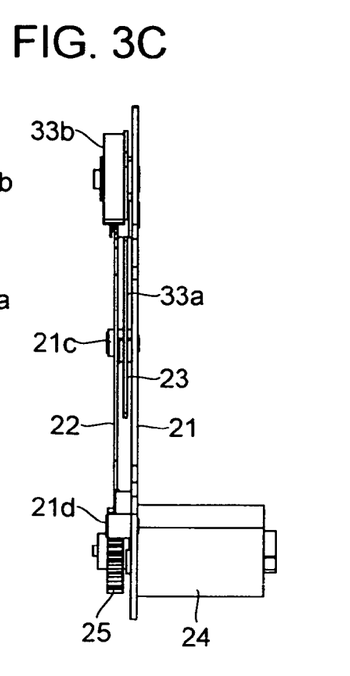

The aperture stop mechanism 3 of a third embodiment of the invention is shown in FIGS. 3A to 3C. FIGS. 3A and 3C are a front view and a side view, respectively, with an aperture 20 fully stopped, and FIG. 3B is a front view with the aperture 20 fully open. The aperture stop mechanism 3 of this embodiment is obtained by partly modifying the aperture blade 23 in the aperture stop mechanism 2 of the second embodiment.

In the aperture stop mechanisms I and 2, the aperture blades 12, 13, 22, and 23 are each formed of a single plate-shaped material, with the gears 12a, 13a, 22a, 22b, and 23a formed by processing edges thereof. By contrast, in the aperture stop mechanism 3, a plate-shaped member 33a with which to define the rim of the aperture 20 and a geared member 33b are fabricated separately, and these are then fixed together to form the aperture blade 23.

The geared member 33b is made of resin, and has a plurality of projections on the surface thereof facing the plate-shaped member 33a. The plate-shaped member 33a has holes formed therein at positions corresponding to the projections on the geared member 33b, and the projections on the geared member 33b are inserted in the holes in the plate-shaped member 33a. The tips of the projections that jut out of the holes are then deformed with heat so as to be fused to around the holes, and thereby the plate-shaped member 33a and the geared member 33b are fixed together. The plate-shaped member 33a and the geared member 33b may be fixed together by any other means, such as with adhesive, by soldering, or by welding. The two members are fixed together by whatever means suits their materials.

As shown in FIG. 3C, the geared member 33b is formed thicker than the plate-shaped member 33a. Thus, even when the aperture blade 22 or 23 slightly moves in the direction perpendicular to the aperture 20, the gears 22a and 23a remain meshed with each other. Moreover, forming the geared member 33b thicker eliminates the need to arrange the aperture blades 22 and 23 on the same plane. In fact, as shown in FIG. 3C, the aperture blades 22 and 23 are arranged on different planes. This helps prevent contact between the end portion of the aperture blade 22 far from the pin 21 a and the end portion of the aperture blade 23 far from the pin 21b, and thus helps give the aperture blades 22 and 23 freer shapes.

Furthermore, forming the plate-shaped member 33a and the geared member 33b out of different materials makes it possible to increase the mechanical strength of the plate-shaped member 33a without unduly increasing the weight of the aperture blade 23. In the example specifically described here, for the aperture blade 22, the gears 22a and 22b are formed by processing edges of a single plate-shaped material. Alternatively, it is also possible to form the aperture blade 22 by fixing together a plate-shaped member and a geared member.

Figure 4A:
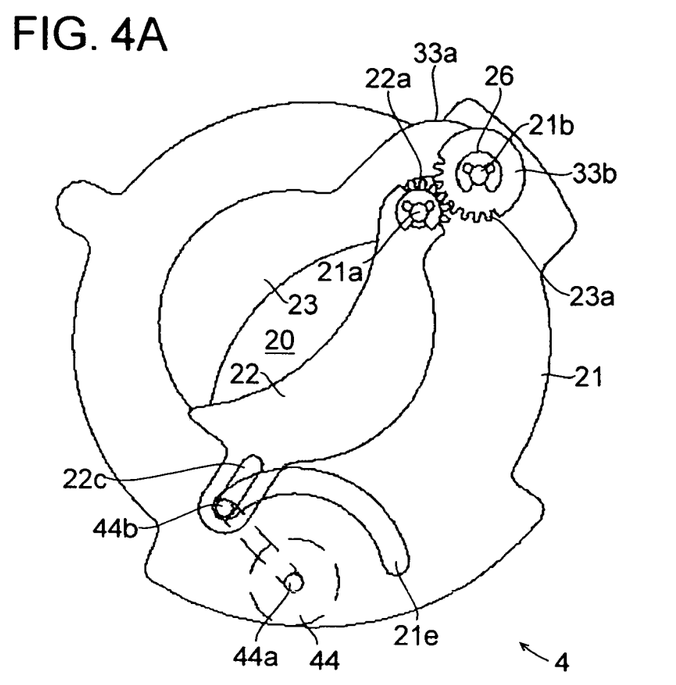
FIGS. 4A and 4B are diagrams schematically showing the construction of the aperture stop mechanism of a fourth embodiment of the invention.
Figure 4B:
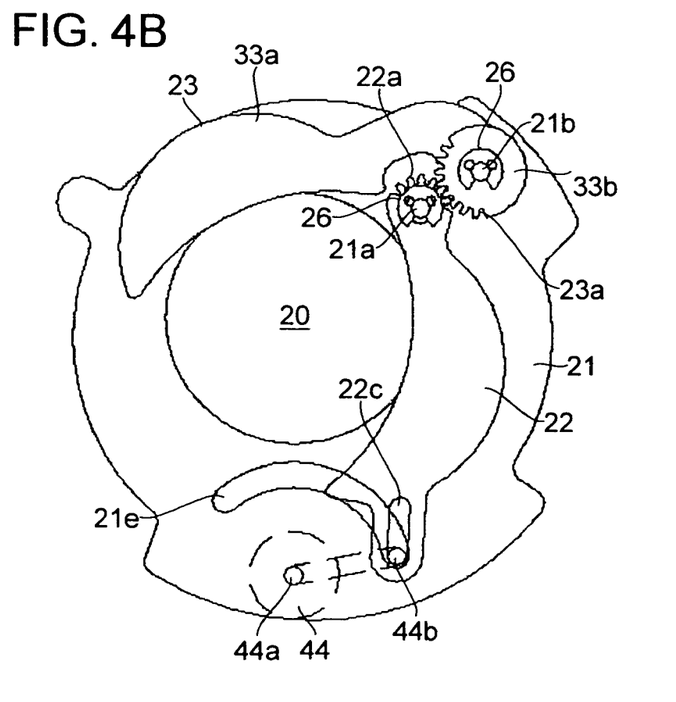

The aperture stop mechanism 4 of a fourth embodiment of the invention is shown in FIGS. 4A and 4B. FIG. 4A is a front view with an aperture 20 fully stopped, and FIG. 4B is a front view with the aperture 20 fully open. The aperture stop mechanism 4 of this embodiment is a further modified version of the aperture stop mechanism 3 of the third embodiment.

In this embodiment, the aperture blade 22 is made to rotate by a motor 44 that has two resting positions in which it can rest. The motor 44 includes a drive portion that produces a rotating force and an output portion that outputs the rotation. When not rotating, the drive portion points either in a first direction or in a second direction. The output portion has a pin 44b at a position deviated from the spindle 44a of the drive portion, so that, when the drive portion is at rest, the pin 44b is located at one of two positions that respectively correspond to the two directions in which the drive portion can point.

Here, the gear 22b formed in the end portion of the aperture blade 22 far from the pin 21a in the aperture stop mechanism 3 is omitted, and instead a hole 22c is formed. In this hole 22c is inserted the pin 44b. As the motor 44 rotates and thus the pin 44b moves, the aperture blade 22 rotates together, and, since the gear 23a meshes with the gear 22a, the aperture blade 23 also rotates. Since the pin 44b rests in one of the two resting positions, in the aperture stop mechanism 4, when the motor 44 is at rest, the size of the aperture 20 is either fully stopped or fully open.

The ranges of movement of the aperture blades 22 and 23 are defined by the range of movement of the pin 44b. Accordingly, in the aperture stop mechanism 4, the pins 21c and 21d provided on the aperture base plate 21 to define both ends of the ranges of movement of the aperture blades 22 and 23 are omitted. Moreover, to permit the pin 44b to move, a hole 21e that describes a circular arc is formed in the aperture base plate 21.

Figure 5A:
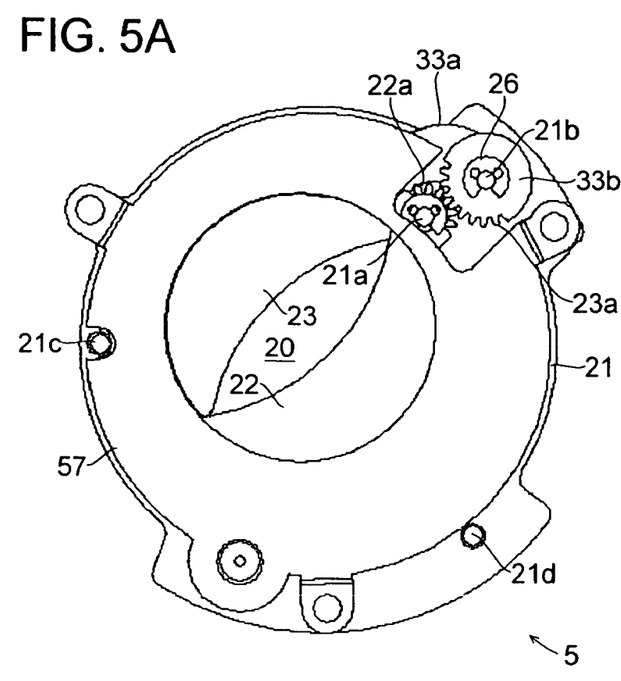
FIGS. 5A to 5D are diagrams schematically showing the construction of the aperture stop mechanism of a fifth embodiment of the invention.
Figure 5B:
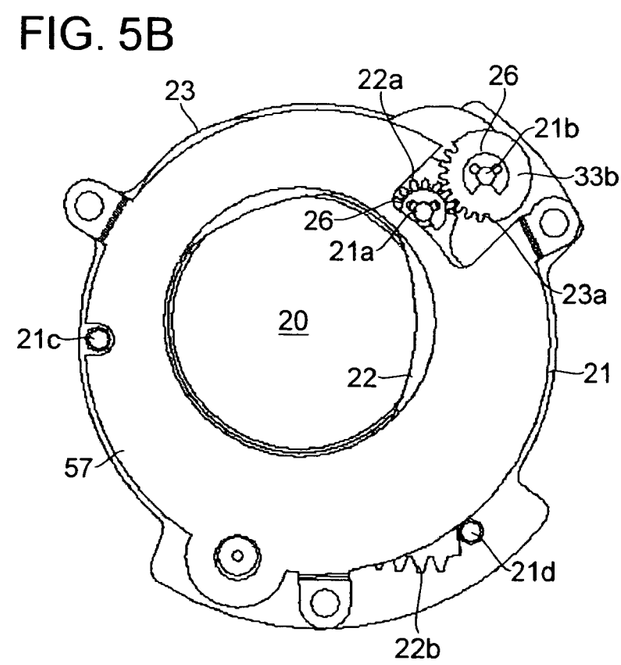
Figure 5C:
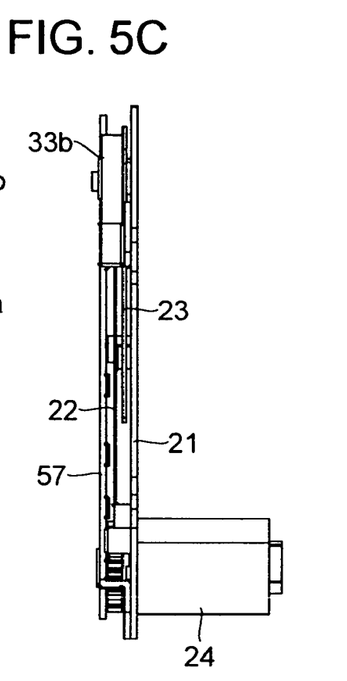
Figure 5D:
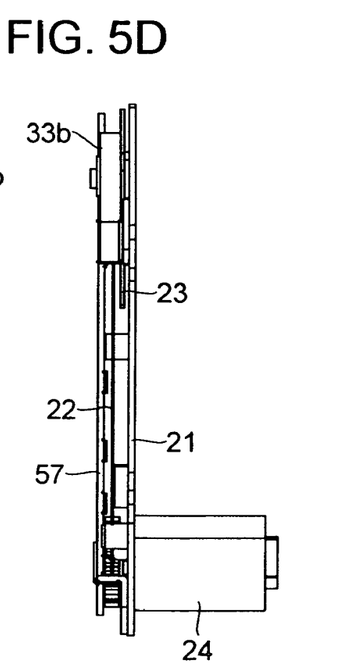

The aperture stop mechanism 5 of a fifth embodiment of the invention is shown in FIGS. 5A to 5D. FIGS. 5A and 5C are a front view and a side view, respectively, with an aperture 20 fully stopped, and FIGS. 5B and 5D are a front view and a side view, respectively, with the aperture 20 fully open. The aperture stop mechanism 5 of this embodiment is obtained by providing the aperture stop mechanism 3 of the third embodiment additionally with an aperture cover 57.

The aperture cover 57 has an opening slightly larger than the opening of the aperture base plate 21. The aperture cover 57 is, in a peripheral portion thereof, fixed to the aperture base plate 21. The aperture blades 22 and 23 are located between the aperture base plate 21 and the aperture cover 57. The movement of the aperture blades 22 and 23 in the direction perpendicular to the aperture 20 is restricted by the E ring 26. The rotation of the aperture blades 22 and 23 can be made easier by securing a gap between them and the E ring 26. Even in this case, the aperture cover 57 surely prevents the movement of the aperture blades 22 and 23 in the direction perpendicular to the aperture 20.

Moreover, when the aperture stop mechanism 5 is fitted to a projector, the aperture cover 57 protects the aperture blades 22 and 23. This prevents damage to the aperture blades 22 and 23, and also makes the fitting work easy.

Figure 6A:
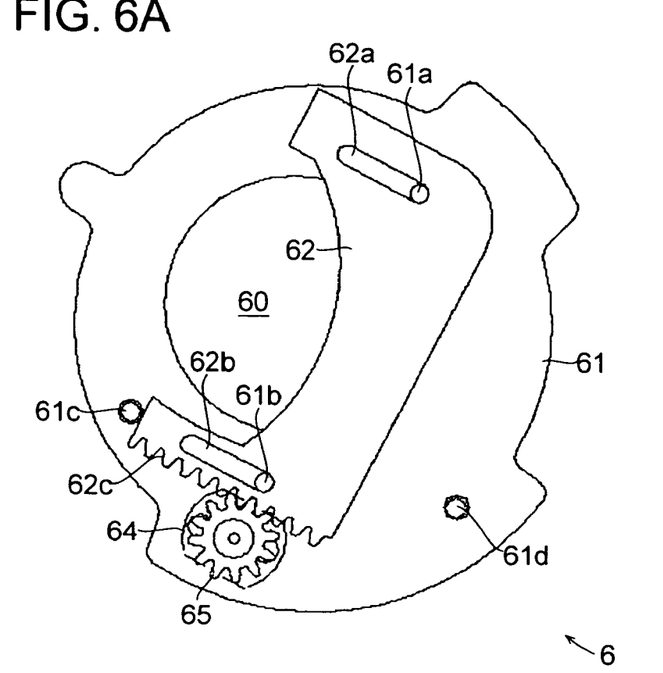
FIGS. 6A and 6B are diagrams schematically showing the construction of the aperture stop mechanism of a sixth embodiment of the invention.
Figure 6B:
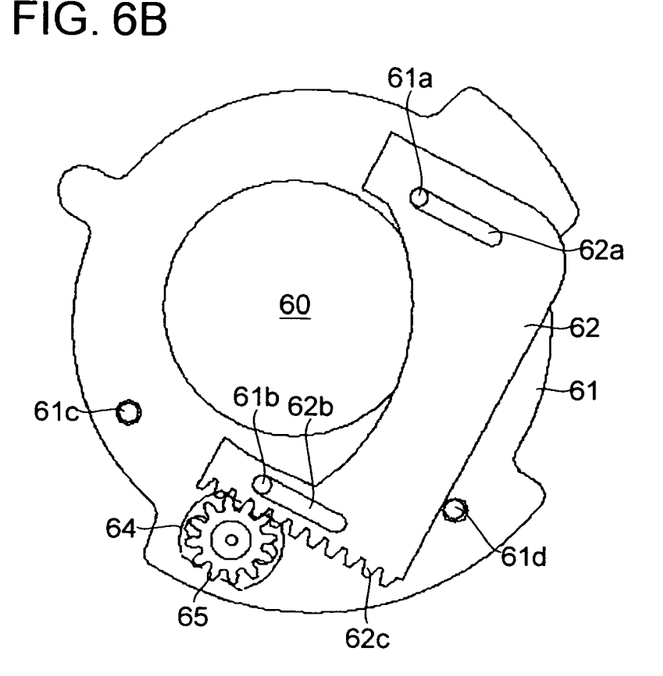

The aperture stop mechanism 6 of a sixth embodiment of the invention is shown in FIGS. 6A and 6B. FIG. 6A is a front view with an aperture 60 fully stopped, and FIG. 6B is a front view with the aperture 60 fully open. The aperture stop mechanism 6 includes an aperture base plate 61, one aperture blade 62, and a motor 64.

The aperture base plate 61 has a large circular opening at the center thereof, and has, on the obverse-side surface thereof (i.e., the side facing the reader in FIG. 6A), four pins 61a, 61b, 61c, and 61d arranged perpendicularly to the opening. The motor 64 is fixed on the reverse-side surface of the aperture base plate 61 in such a way that the spindle of the motor 64 reaches the obverse-side surface of the aperture base plate 61 through a small hole formed therein.

The aperture blade 62 is made of metal, is plate-shaped, has an edge that describes a substantially circular arc with which to define the rim of the aperture 60, and is arranged on the obverse-side surface of the aperture base plate 61. In opposite end portions of the aperture blade 62, cam grooves 62a and 62b are formed parallel to each other. In these cam grooves 62a and 62b are inserted the pins 61a and 61b of the aperture base plate 61. Thus, the aperture blade 62 can move in the direction parallel to the cam grooves 62a and 62b.

At the edge of one end portion of the aperture blade 62, a gear 62c is formed along a straight line parallel to the cam grooves 62a and 62b. This gear 62c meshes with a motor gear 65 that is fixed to the spindle of the motor 64. As the motor 64 rotates, the aperture blade 62 moves in a direction along the aperture 60. This permits the aperture to vary the size, shape, and position thereof.

The aperture blade 62, when it travels a predetermined distance in one direction, makes contact with the pin 61c of the aperture base plate 61, and, when it travels a predetermined distance in the opposite direction, makes contact with the pin 61d. That is, the pins 61c and 61d define both ends of the range of movement of the aperture blade 62. The pins 61c and 61d may be omitted, in which case the pins 61a and 61b are used to define both ends of the range of movement of the aperture blade 62. In this case, the length of the cam grooves 62a and 62b is made equal to the total length of the range of movement.

Figure 7:
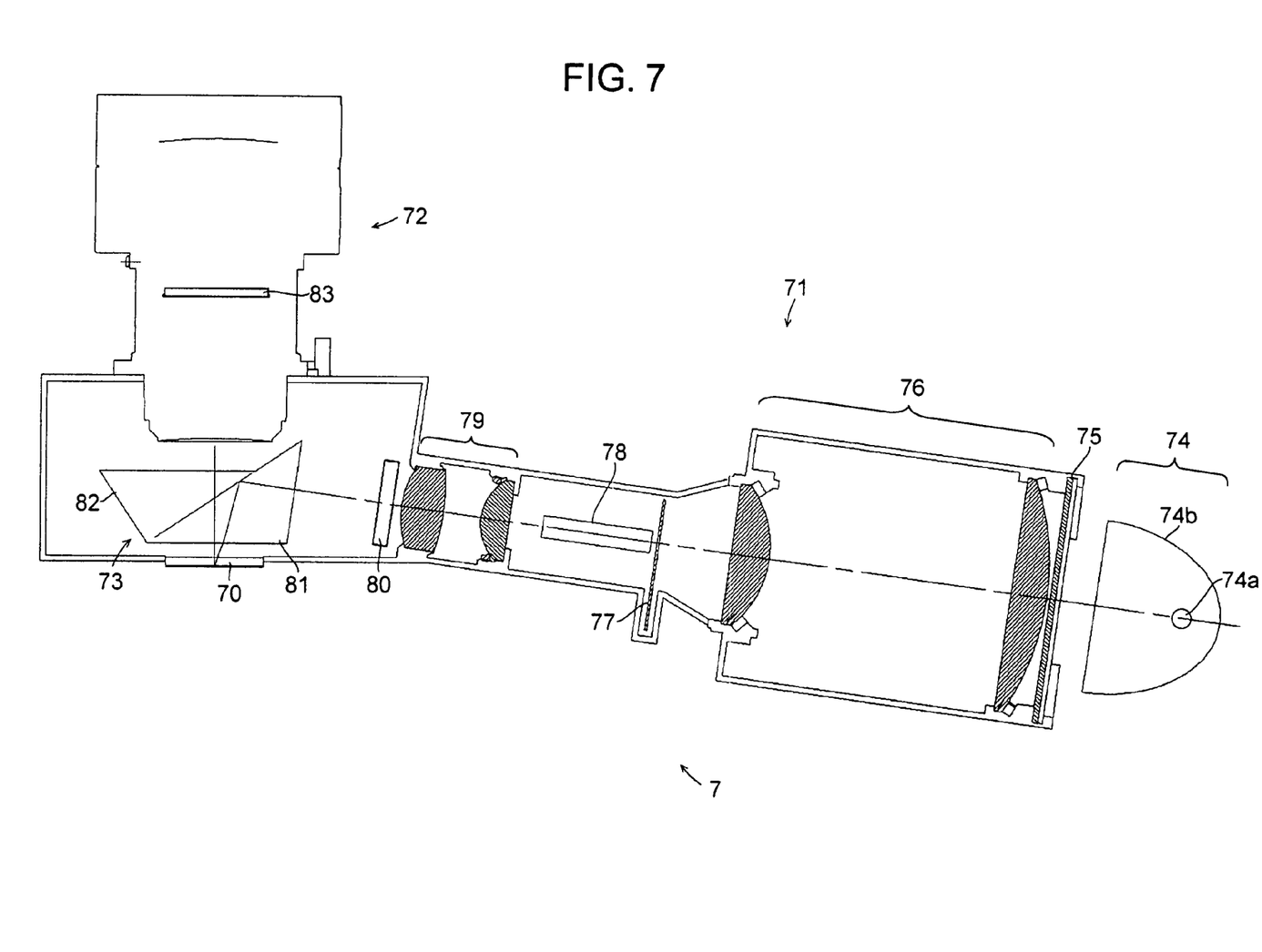
FIG. 7 is a diagram schematically showing the optical construction of the projector of a seventh embodiment of the invention.

The construction of the projector 7 of a seventh embodiment of the invention is shown in FIG. 7. This projector 7 includes, in the display section thereof for displaying an image, a DMD 70. The DMD 70 is fed with illumination light so as to modulate the illumination light with the image displayed on the DMD 70 and thereby produce image light that represents the image.

The DMD 70 includes a large number of mirror elements that are arranged in a two-dimensional array and of which the orientation can be changed individually. How the illumination light is modulated, and hence what image is represented by the modulated light, depends on how the individual mirror elements are oriented. The light from those mirror elements which point in a predetermined direction forms the image light, and the light from those mirror elements which point in other directions is discarded as unnecessary light.

The projector 7 further includes an illumination optical system 71 that feeds the DMD 70 with illumination light, a projection optical system 72 that projects the image light from the DMD 70 onto a screen to display an image thereon, and a separation optical system 73 that separates the projection light from the illumination light.

The illumination optical system 71 includes a light source 74, an IR/UV cut filter 75, a condenser optical system 76, a color wheel 77, an integrator rod 78, a relay optical system 79, and an aperture stop mechanism 80. The light source 74 includes a lamp 74a that emits white light and a reflector 74b that has the shape of a paraboloid of revolution so as to form the light emitted from the lamp 74a into a parallel beam.

The IR/UV cut filter 75 eliminates infrared and ultraviolet light contained in the light from the light source 74. The condenser optical system 76 focuses the light from the light source 74 on the entrance-side end surface of the integrator rod 78. The color wheel 77 has three types of filter that respectively transmit red (R), green (G), and blue (B) light. The color wheel 77 rotates so as to transmit R, G, and B light alternately.

The light that has entered the integrator rod 78 through the entrance-side end surface thereof is, by being totally reflected from the side surfaces thereof, directed to the exit-side end surface thereof. Thus, rays of light that strike the entrance-side end surface of the integrator rod 78 at different angles of incidence are totally reflected from the side surfaces thereof different numbers of times, and then reach different parts of the exit-side end surface thereof. This gives a uniform intensity distribution to the light that exits from the integrator rod 78 through the exit-side end surface thereof. The relay optical system 79 focus the light emanating from the exit-side end surface of the integrator rod 78 on the DMD 70.

The aperture stop mechanism 80 is one of the aperture stop mechanisms 1 to 6 of the first to sixth embodiments, and serves to adjust the diameter of the beam of light. The aperture stop mechanism 80 is disposed near the pupil of the illumination optical system 71. The pupil of the illumination optical system 71 is optically conjugate with the entrance-side end surface of the integrator rod 78, and is also conjugate with the pupil of the projection optical system 72.

The separation optical system 73 includes two prisms 81 and 82. The prisms 81 and 82 are disposed at a very small distance from each other, with a gap left therebetween. The light that has passed through the aperture stop mechanism 80 enters the prism 81, is then totally reflected from the surface thereof facing the prism 82, and thus becomes illumination light that illuminates the DMD 70.

The illumination light that has struck the DMD 70 is, when it is reflected from the DMD 70, modulated thereby to become image light that represents an image. The image light from the DMD 70 enters the prism 81 for the second time, is then transmitted through the surface thereof facing the prism 82, and is then transmitted also through the prism 82. The image light transmitted through the prism 82 then enters the projection optical system 72.

The projection optical system 72 includes a plurality of lens units (not illustrated) and an aperture stop mechanism 83. The projection optical system 72 projects the image light onto the screen so that an enlarged image of the image displayed on the DMD 70 is formed on the screen. The aperture stop mechanism 83 is one of the aperture stop mechanisms 1 to 6 of the first to sixth embodiments, and serves to adjust the diameter of the beam of light. The aperture stop mechanism 83 is disposed near the pupil of the projection optical system 72. Of the light reflected from the DMD 70, the light other than the image light, i.e., unnecessary light, either does not enter the projection optical system 72 or, even if it enters it, is intercepted by the aperture stop mechanism 83, and thus does not degrade the quality of the image formed on the screen.

By varying the apertures of the aperture stop mechanism 80 of the illumination optical system 71 and of the aperture stop mechanism 83 of the projection optical system 72, it is possible to adjust the brightness and contrast of the image formed on the screen. Specifically, opening the apertures of the aperture stop mechanisms 80 and 83 makes the image brighter, and stopping the apertures of the aperture stop mechanisms 80 and 83 gives the image higher contrast.

In a case where, as in the projector 7 of this embodiment, a DMD is used in the display section, it is preferable to give noncircular shapes to the apertures of the aperture stop mechanisms 80 and 83 when they are small as in the first to sixth embodiments. The reason is that this helps minimize the lowering of brightness while maintaining comparable contrast as compared with when the apertures are given circular shapes. It is possible to give the apertures noncircular shapes by adopting a construction that uses two aperture blades, and this construction is advantageous because it requires a small number of components. In a case where, as in this case, only a small number of aperture blades are used, by adopting a mechanism according to the present invention, it is possible to further reduce the number of components without difficulty.

In the mechanism described above, it is preferable to locate the center of rotation of the aperture blades on the line extending from the aperture in the direction of the greatest dimension across the noncircular shape thereof. The reason is that, by doing so, it is possible to reduce the maximum dimension of the area occupied by the aperture blades when the aperture stop mechanisms 80 and 83 are fully open, and thus it is possible to make sufficiently compact the sizes of the illumination optical system 71 and the projection optical system 72.

Although not illustrated, the projector 7 further includes an operation section that is operated by the user to specify the brightness and contrast of the image and an aperture control section that controls the sizes of the apertures of the aperture stop mechanisms 80 and 83 as specified by the user. The projector 7 also includes a display control section that controls the rotation of the color wheel 77 and that makes the DMD 70 display the R, G, and B components of the image alternately according to which of R, G, and B light is being transmitted through the color wheel 77. This makes it possible to present color images.

Obviously, many modifications and variations of the present invention are possible in light of the above teachings. It is therefore to be understood that within the scope of the appended claims, the invention may be practiced other than as specifically described.

What is claimed is:

1. An aperture stop mechanism for forming an aperture through which to pass light, the aperture stop mechanism comprising: a first movable member that defines a rim of the aperture, that changes a position thereof by moving in a direction alone the aperture, and that permits at least one of a size, shape, and position of the aperture to vary,
   wherein the first movable member has a first gear, and moves as a result of the first gear being driven,
   wherein the first movable member has a second gear, and
   wherein the first and second gears are formed along circular arcs that are concentric but have different pitch circle radii.

2. An aperture stop mechanism as claimed in claim 1, further comprising:
   a second movable member that defines the rim of the aperture and that changes a position thereof by moving in a direction along the aperture,
   wherein the second movable member has a third gear, and wherein the first and second movable members are coupled together as a result of the second and third gears meshing with each other.

3. An aperture stop mechanism for forming an aperture through which to pass light, the aperture stop mechanism comprising:
a first movable member that defines a rim of the aperture, that changes a position thereof by moving in a direction along the aperture, and that permits at least one of a size, shape, and position of the aperture to vary,
wherein the first movable member has a first gear, and moves as a result of the first gear being driven,
wherein the first gear is formed along a straight line, and
wherein, as a result of the first gear moving, the first movable member, by moving rectilinearly, makes at least one of the size, shape, and position of the aperture vary.

4. An aperture stop mechanism as claimed in claim 3, wherein the aperture has a noncircular shape when small, and
wherein a center of rotation of the first movable member is located on a line extending from the aperture in a direction of a greatest dimension across the noncircular shape of the aperture.

5. An aperture stop mechanism for forming an aperture through which to pass light, the aperture stop mechanism comprising:
a first movable member that defines a rim of the aperture, that changes a position thereof by moving in a direction along the aperture, and that permits at least one of a size, shape, and position of the aperture to vary,
wherein the first movable member has a first gear, and moves as a result of the first gear being driven; and
a second movable member that defines the rim of the aperture and that changes a position thereof by moving in a direction along the aperture,
wherein the second movable member has a second gear, and
wherein the first and second movable members are coupled together as a result of the first and second gears meshing with each other.

6. An aperture stop mechanism as claimed in claim 5, wherein the first gear is formed along a circular arc, and
wherein, as a result of the first gear rotating, the first movable member makes at least one of the size, shape, and position of the aperture change vary.

7. An aperture stop mechanism as claimed in claim 5, wherein the second movable member can rotate about a center of rotation of the second gear, and
wherein the first movable member moves as a result of the second movable member rotating.

8. An aperture stop mechanism as claimed in claim 5, further comprising:
a movement range defining member that defines both ends of a movement range of the first movable member.

9. An aperture stop mechanism as claimed in claim 5, wherein the first movable member is plate-shaped, and has, at an edge thereof, the first gear and a portion that defines the rim of the aperture.

10. An aperture stop mechanism as claimed in claim 5, wherein the first movable member is formed by fixing together a portion that defines the rim of the aperture and a portion having the first gear formed thereon.

11. An aperture stop mechanism as claimed in claim 5, further comprising:
a movement direction restricting member that restricts movement of the first movable member in a direction perpendicular to the aperture.

12. An aperture stop mechanism as claimed in claim 5, further comprising:
an actuator that makes the first movable member move.

13. An aperture stop mechanism as claimed in claim 12, wherein the actuator rests in one of two positions.

14. An aperture stop mechanism as claimed in claim 5, wherein the aperture has a noncircular shape when small, and
wherein a center of rotation of the first movable member is located on a line extending from the aperture in a direction of a greatest dimension across the noncircular shape of the aperture.

15. An aperture stop mechanism for forming an aperture through which to pass light, the aperture stop mechanism comprising:
a first aperture blade that defines a rim of the aperture, the first aperture blade having a first gear, the first aperture blade being held so as to be pivotable about a center of rotation of the first gear; and
a second aperture blade that defines the rim of the aperture, the second aperture blade having a second gear that meshes with the first gear, the second aperture blade being held so as to be pivotable about a center of rotation of the second gear,
wherein, as a result of the first aperture blade being rotated by an actuator, the second aperture blade rotates and thereby permits a shape and size of the aperture to vary.

16. An illumination optical system for directing illumination light to an image display device that produces image light from the illumination light, the illumination optical system comprising:
an aperture stop mechanism for forming an aperture through which to pass the illumination light, wherein the aperture stop mechanism comprises:
a movable first aperture blade that defines a rim of the aperture and that moves in a direction along the aperture, the aperture stop mechanism permitting at least one of a size, shape, and position of the aperture to vary as a result of the movable first aperture blade moving,
wherein the movable first aperture blade has a first gear, and moves as a result of the first gear being driven, the movable first aperture blade being held so as to be pivotable about a center of rotation of the first gear;
a second aperture blade that defines the rim of the aperture, the second aperture blade having a second gear that meshes with the first gear, the second aperture blade being held so as to be pivotable about a center of rotation of the second gear; and
wherein the aperture stop mechanism is disposed near a pupil of the illumination optical system, and wherein, as a result of the first aperture blade being rotated by an actuator, the second aperture blade rotates and thereby permits a shape and size of the aperture to vary.

17. An illumination optical system as claimed in claim 16, wherein the aperture has a noncircular shape when small, and
wherein a center of rotation of the movable member is located on a line extending from the aperture in a direction of a greatest dimension across the noncircular shape of the aperture.

18. A projection optical system for projecting image light onto a screen, the projection optical system comprising:

an aperture stop mechanism for forming an aperture through which to pass the image light, wherein the aperture stop mechanism comprises:
  a movable first aperture blade that defines a rim of the aperture and that moves in a direction along the aperture, the aperture stop mechanism permitting at least one of a size, shape, and position of the aperture to vary as a result of the movable first aperture blade moving,
    wherein the movable first aperture blade has a first gear, and moves as a result of the first gear being driven, the movable first aperture blade being held so as to be pivotable about a center of rotation of the first gear;
  a second aperture blade that defines the rim of the aperture, the second aperture blade having a second gear that meshes with the first gear, the second aperture blade being held so as to be pivotable about a center of rotation of the second gear; and
wherein the aperture stop mechanism is disposed near a pupil of the projection optical system, and wherein, as a result of the first aperture blade being rotated by an actuator, the second aperture blade rotates and thereby permits a shape and size of the aperture to vary.

19. A projection optical system as claimed in claim 18,
wherein the aperture has a noncircular shape when small, and
wherein a center of rotation of the movable member is located on a line extending from the aperture in a direction of a greatest dimension across the noncircular shape of the aperture.

20. A projector comprising:
an image display device that produces image light by modulating illumination light;
a light source that feeds the illumination light;
an illumination optical system that directs the illumination light from the light source to the image display device; and
a projection optical system that projects the image light from the image display device,
wherein the illumination optical system has a first aperture stop mechanism disposed near a pupil thereof,
the first aperture stop mechanism comprising:
  a movable first aperture blade that defines a rim of an aperture through which to pass the illumination light and that moves in a direction along the aperture, the first aperture stop mechanism permitting at least one of a size, shape, and position of the aperture to vary as a result of the movable first aperture blade moving,
    wherein the movable first aperture blade has a first gear, the movable first aperture blade moving as a result of the first gear being driven, the movable first aperture blade being held so as to be pivotable about a center of rotation of the first gear;
  a second aperture blade that defines the rim of the aperture, the second aperture blade having a second gear that meshes with the first gear, the second aperture blade being held so as to be pivotable about a center of rotation of the second gear; and
  wherein, as a result of the first aperture blade being rotated by an actuator, the second aperture blade rotates and thereby permits a shape and size of the aperture to vary.

21. A projector as claimed in claim 20,
wherein the projection optical system has a second aperture stop mechanism,
the second aperture stop mechanism having a second movable member that defines a rim of an aperture through which to pass the image light and that moves in a direction along the aperture, the second aperture stop mechanism permitting at least one of a size, shape, and position of the aperture to vary as a result of the second movable member moving,
the second movable member having a second gear, the second movable member moving as a result of the second gear being driven.

* * * * *